United States Patent
Revsin et al.

(10) Patent No.: US 7,561,523 B1
(45) Date of Patent: Jul. 14, 2009

(54) METHOD AND APPARATUS FOR FLOW CONTROL IN A RELIABLE MULTICAST COMMUNICATION SYSTEM

(75) Inventors: Vitaly S. Revsin, Andover, MA (US); Alexander M. Pass, North Andover, MA (US); Irina P. Slutsky, Andover, MA (US)

(73) Assignee: NetApp, Inc., Sunnyvale, CA (US)

( * ) Notice: Subject to any disclaimer, the term of this patent is extended or adjusted under 35 U.S.C. 154(b) by 1140 days.

(21) Appl. No.: 10/237,344

(22) Filed: Sep. 9, 2002

Related U.S. Application Data

(60) Provisional application No. 60/334,720, filed on Nov. 15, 2001.

(51) Int. Cl.
G08C 15/00 (2006.01)
(52) U.S. Cl. .................. 370/236; 370/229; 370/235; 370/230
(58) Field of Classification Search .......... 370/229, 370/235, 236, 230, 252, 253
See application file for complete search history.

(56) References Cited

U.S. PATENT DOCUMENTS

| | | | | |
|---|---|---|---|---|
| 5,477,550 A | * | 12/1995 | Crisler et al. | 714/748 |
| 5,781,801 A | * | 7/1998 | Flanagan et al. | 710/56 |
| 6,167,027 A | * | 12/2000 | Aubert et al. | 370/230 |
| 6,965,943 B1 | * | 11/2005 | Golestani | 709/235 |
| 7,102,998 B1 | * | 9/2006 | Golestani | 370/235 |
| 7,181,223 B1 | * | 2/2007 | Pecen et al. | 455/452.1 |

* cited by examiner

Primary Examiner—Ricky Ngo
Assistant Examiner—Chandrahas Patel
(74) Attorney, Agent, or Firm—Blakely, Sokoloff, Taylor & Zafman LLP

(57) ABSTRACT

A method and system for flow control in a reliable multicast communication protocol, in which a transmitting device transmits sets of multiple data transfer units (DTUs) referred to as "bursts." The transmitting device continues transmitting DTUs within a burst independently with regard to the receipt of any acknowledgements (referred to as "status reports") from a number of receiving devices. The transmitting device continues to transmit multiple bursts until the transmitting device reaches a predetermined limitation, referred to as a "burst sliding window" size. The transmitting device transmit DTUs in bursts while a total number of outstanding bursts that have not been acknowledged as received correctly does not exceed the size of the burst sliding window. The burst sliding window size may reflect transmission capacity of the transmitting device and/or receipt capacity of the receiving devices.

32 Claims, 6 Drawing Sheets

METHOD AND APPARATUS FOR FLOW CONTROL IN A RELIABLE MULTICAST COMMUNICATION SYSTEM

CROSS REFERENCE TO RELATED APPLICATIONS

This application claims priority under 35 U.S.C. §119(e) to provisional patent application Ser. No. 60/334,720 filed Nov. 15, 2001.

STATEMENT REGARDING FEDERALLY SPONSORED RESEARCH OR DEVELOPMENT

N/A

BACKGROUND OF THE INVENTION

The present invention relates generally to communication protocols, and more specifically to a system for providing flow control in a reliable, multicast enabled communication network.

In many network applications, data cannot be transmitted from a sender to one or more receiver(s) at an arbitrary speed. The rate of data transmission must account for the fact that, at some point, a receiver's memory resources may become exhausted. In order to avoid this condition some kind of limitation on the data transmission must be imposed. The systems that define and impose such limitations are commonly referred to as flow control systems. In the Transmission Control Protocol (TCP) of the TCP/IP protocol stack, flow control is provided between a single transmitter and a single receiver through use of what is known as a "sliding window." In the TCP protocol, the sliding window defines a maximum number of "outstanding" bytes that may be transmitted by a device without acknowledgement by a single destination device.

A significant drawback in existing systems relates to communication over networks that include multipoint delivery capabilities over large latency links, such as those provided via multicast addressing through a communication satellite. In such an operational environment, a transmitting device may be sending data to hundreds or even thousands of destination devices. For example, using the TCP protocol to provide flow control in such a context would require forming TCP connections between the transmitting device and each receiving device, resulting in significant additional overhead. Moreover, the TCP protocol is limited in the number of outstanding messages that a transmitting device can send without acknowledgement. In a network with large communication latency, such as through a communication satellite, such a limitation may have a significant impact on network performance. Another communications protocol in the TCP/IP protocol stack is UDP (User Datagram Protocol). While UDP does not require the connection setup overhead associated with TCP, UDP suffers from a lack of delivery guarantees, which is unacceptable in many applications.

A significant design consideration in communication satellite based networks is the use of a "back-channel" for delivery of acknowledgements from receiving devices. In many cases, the transmitting device will be using a relatively high-bandwidth data channel for communication with the receivers, while the acknowledgements from the receiving devices are sent back to the transmitter over a somewhat lower bandwidth back-channel that may have a higher loss rate than the data channel. An example of such a back-channel that may be used in this way is the Internet. Accordingly, it would be desirable to enable a transmitter to transmit a relatively large amount of data without waiting for acknowledgements from potentially large numbers of receivers over a back-channel that may be somewhat slow and relatively unreliable.

The above problems become exacerbated as the broadcast of music, videos, news, or live events from content server systems to PCs becomes increasingly popular. In this context, the flow of data should take place via a stable connection with optimal speed. The data files transferred may include various types of data, including static images, video data, audio data, executable files, presentation data, applet data, data files, and the like. Such media files are generally referred to as "streaming media." Delivery of streaming media typically involves transmission at a select (often subscribed) bit-rate, and with a desired timeliness. The streaming media is adapted for playback in a desired order without regard to the order the streaming media data are received by a client system. In view of these requirements, any solution to the above deficiencies in existing systems should be capable of supporting different streaming media formats, and operate to deliver content in a high-quality form and without delay of transmission.

SUMMARY OF THE INVENTION

In accordance with the present invention, a method and system are disclosed for flow control applicable to a reliable multicast communication protocol. In the disclosed system, a transmitting device transmits sets of multiple data transfer units (DTUs), referred to as "bursts", to multiple receiving devices. The transmitting device continues transmitting DTUs within a burst independently with regard to the receipt of any specific acknowledgements (referred to herein as "status reports") from individual receiving devices. The transmitting device continues to transmit multiple bursts until the transmitting device reaches a predetermined limitation, referred to as a "burst sliding window" size. In other words, the transmitting device operates to transmit DTUs in bursts while a total number of outstanding bursts that have not been acknowledged as received correctly at all receiving devices does not exceed the size of the burst sliding window. In an illustrative embodiment, the burst sliding window size reflects both transmission capacity of the transmitting device and receipt capacity of the receiving devices, and the receipt capacity may be determined dynamically based on information in status reports received by the transmitting device from the receiving devices.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

All disclosures of U.S. provisional patent application No. 60/334,720, filed Nov. 15, 2001, and entitled "A Method and Apparatus for Flow Control in a Reliable Multicast Communication System," are hereby incorporated herein by reference.

Figure 1:
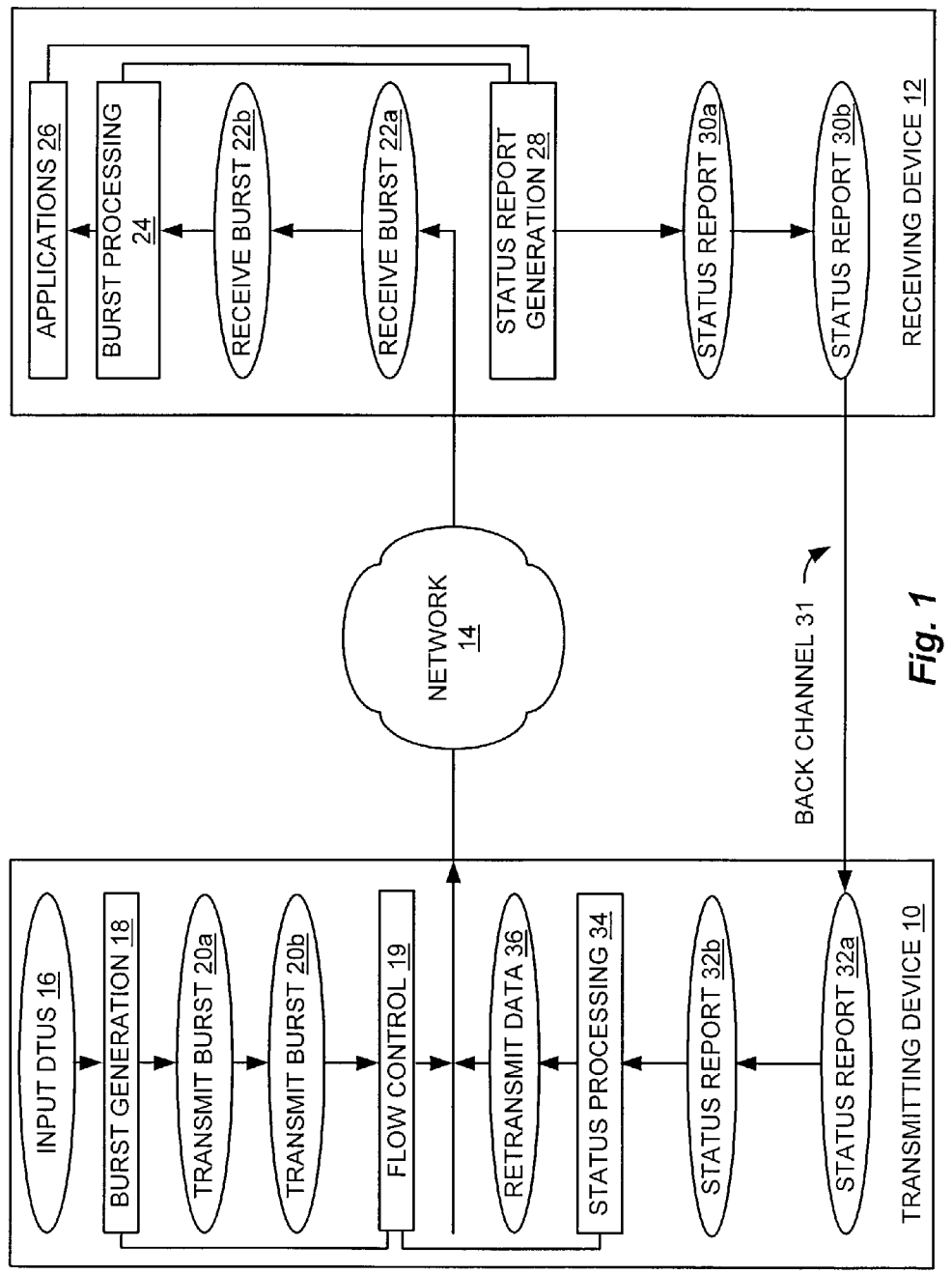
FIG. 1 is a block diagram showing a transmitting device and a receiving device communicating over a communication network.

FIG. 1 shows a transmitting device 10 and a receiving device 12 that are communicably attached to a network 14. The transmitting device 10 and/or receiving device 12 may each be embodied as any specific type of network attached device, such as server computer systems, personal computers, workstations, or other network enabled devices which operate to communicate over a communication network. The transmitting device 10 and/or receiving device 12 may each include one or more processors, as well as computer program storage and/or memory for storing computer program code that is executable on such processors. The transmitting device 10 and receiving device 12 may each further include various input/output interfaces, including network interfaces to the network 14. The network 14 may, for purposes of explanation, consist of any appropriate communication media and networking protocols which enable the transfer of information between the transmitting device 10 and the receiving device 12. In one embodiment, the network 14 is a communication satellite based network over which the transmitting device 10 communicates with multiple receiving devices, such as the receiving device 12, using multicast or group destination addresses. Further for purposes of illustration, the network 14 may employ an underlying communication protocol such as TCP/IP or the like to support various layers of communication among the devices to which it is attached.

During operation of the devices shown in FIG. 1, data transfer units (DTUs) 16 are passed to a burst generation component 18 of the transmitting device 10. The disclosed system may be used with any specific kind of DTU, including packets, cells, or other appropriate types of data blocks for a given implementation. The burst generation component 18 may, for example, be embodied using any appropriate combination of software code and/or programmable or custom hardware based technology. The burst generation component 18 in the transmitting device 10 operates to organize the DTUs it is provided into reliably delivered sets of DTUs, referred to herein as "bursts", that are stored in memory within the transmitting device 10 by the burst generation component 18. Multiple bursts may be processed simultaneously in both the transmitting device and the receiving device(s). The input DTUs may be provided to the burst generation component 18 continuously, periodically, or as needed by application programs executing on the transmitting device 10.

The burst generation component 18 operates to continuously process the input DTUs 16 to produce a stream of transmit bursts, shown for purposes of illustration as transmit burst 20a and transmit burst 20b, that are stored within the transmitting device 10 for subsequent transmission. Multiple transmit bursts may be processed simultaneously in the transmitting device 10, such that burst generation and transmission may continue even in the case where a DTU from a previously transmitted burst has not been acknowledged, or in the case where one or more DTUs in a previously transmitted burst have been indicated as lost or damaged by one or more receiving devices. While for purposes of illustration FIG. 1 shows 2 transmit bursts 20a and 20b, the number of transmit bursts that may be processed simultaneously by the transmitting device 10 in the disclosed system is not limited to that number, and any specific number or range of numbers of transmit bursts may be processed simultaneously by a transmitting device in a specific embodiment. In one embodiment, the transmit bursts processed simultaneously in the transmit device are each stored for potential retransmission, so that when a convenient time is reached, those DTUs from previously transmitted bursts that have been indicated as lost or damaged by at least one receiving device, or that have not been acknowledged after some predetermined time limit, can be retransmitted to at least those receiving devices to which they were either incorrectly delivered or not delivered at all. These simultaneously processed transmit bursts stored in the memory of the transmitting device 10 are referred to herein as "outstanding" bursts until their correct receipt has been confirmed by all receiving devices to which they are transmitted.

A flow control component 19 determines whether each of the transmit bursts 20a and 20b, as generated by the burst generation component 18, are sent by the transmitting device 10 over the network 14 to one or more receiving devices, shown for purposes of illustration as the receiving device 12 in FIG. 1. The flow control component 19 of FIG. 1 may, for example, be embodied using any appropriate combination of software code and/or programmable or custom hardware based technology. The flow control component 19 operates in response to the burst generation component 18 and a status processing component 34 to determine a number of outstanding bursts. The number of outstanding bursts may, for example, represent the number of bursts that have been previously generated and/or transmitted, and that have not been confirmed as correctly received by each receiving device to which they were sent. The information regarding correct receipt of bursts at various receiving devices is derived by the flow control component 19 from the status processing component 34 based on the contents of status reports received from the various receiving devices as described further below. The maximum permitted number of outstanding bursts, referred to herein as the size of the "burst sliding window", may be a predetermined value provided by a system manager through a system management interface to the transmitting device 10, or may be negotiated between the transmitting device 10 and a number of receiving devices prior to or during a communication session between the transmitting device 10 and such receiving devices. For example, the maximum permitted number of outstanding bursts may be determined prior to the beginning of data transmission by the transmitting device to the receiving devices as the number of bursts which can be stored in the minimum of either the allocated storage available in the transmitting device for outstanding bursts or the smallest amount of storage allocated for received burst processing in any one of the receiving devices in the session. The amount of allocated storage available in the receiving devices may be provided to the transmitting device prior to initiation of the communication session either through a polling protocol or an announcement protocol in which the messages including allocated storage values from the receiving devices are provided to the transmitting device.

In an exemplary embodiment, the transmitting device 10 operates to dynamically determine the size of the burst sliding window as the lesser of a "sender window" size for the transmitting device, and the smallest "receiver window" size among multiple receiving devices. In such an embodiment, the "sender window" size reflects the amount of available resources, such as memory allocated as a transmit buffer, for storing previously transmitted bursts in the transmitting device. The size of the sender window may, for example, be stored in terms of a number bursts. Similarly, the "receiver window" size for each receiving device reflects the available resources, such as memory allocated as a receive buffer, in the corresponding receiving device. The receiver window size may be dynamically determined based on information contained in status report messages received from individual receiving devices. Such information may include a current number of DTUs or bytes that can be stored from received bursts in the respective receiving device at the time the status report message was generated. Such information may also indicate the last received burst, or total number of received bursts at the receiving device during the current communication session at the time the status report message was generated. In general, the limitation of the burst sliding window size may be defined as a permitted number of outstanding bursts.

The illustrative receiving device 12 in FIG. 1 receives bursts from the transmitting device 10, shown as the receive bursts 20a and 20b. Like the transmitting device 10, the receiving device 12 may process multiple bursts, shown as receive burst 20a and receive burst 20b, simultaneously. In other words, if one or more DTUs of a given burst are either missing or damaged, the receiving device nevertheless continues processing subsequent bursts to determine whether the DTUs within them have been received correctly, and to pass correctly received bursts or portions of bursts to higher software layers, such as application programs 26 executing on the receiving device 12. In FIG. 1, the receive bursts 22a and 22b are shown being processed simultaneously by the receive burst processing component 24 in the receiving device 12. While two receive bursts are shown being processed simultaneously for purposes of illustration in FIG. 1, the invention is not so limited, and any number of receive bursts may, be simultaneously processed in the receiving device 12 in a given embodiment. For example, those multiple receive bursts being processed simultaneously in the receiving device 12 may consist of and/or include some number of previously received bursts in which at least one DTU was either lost or incorrectly delivered, so that when a correct retransmission of that DTU is received, it may be combined with the previous correctly received DTUs in the burst to complete the burst. Such a completed burst may then be delivered to one or more software applications 26 on the receiving device 12.

The receive burst processing component 24 in the receiving device 12 may, for example, be embodied using any appropriate combination of software code and/or programmable or custom hardware based technology. The receive burst processing component 24 determines which of the DTUs within the receive bursts 22a and 22b have been correctly received, and passes on a description of any lost or damaged DTUs to the status report generating component 28. As further receive bursts arrive at the receiving device 12, the receive burst processing component 24 also operates to pass the DTUs from the receive bursts 22a and 22b to one or more of the application programs 26 for processing. The application programs 26 in turn operate to report the processing status of each DTU to the status report generating component 28.

In parallel with the operation of the burst processing component 24 and the application programs 26, the status report generating component 28 processes information regarding correct delivery and processing of received DTUs in order to generate a continuous stream of status report messages, such as the status reports 30a and 30b shown in FIG. 1. The receiving device 12 further operates to continuously transmit the status reports such as 30a and 30b to the transmitting device 10, where received status reports are shown as the received status reports 32a and 32b. The status reports 30a and 30b may be conveyed to the transmitting device 10 using any appropriate type of message format, such as a burst, single DTU, or other type of message. In a first embodiment, the status reports 30a and 30b are conveyed from the receiving device 12 to the transmitting device 10 over a back channel 31, separate from the network 14 over which data bursts are sent from the transmitting device 10 to the receiving device 12. In the case where the network 14 is a communication satellite based network over which the transmitting device 10 communicates with multiple receiving devices, the back channel 31 may be provided using a relatively low bandwidth, high latency communication service, for example over the Internet. In such an embodiment, the status report messages are provided via TCP/IP packets sent by the receiving device 12 to the transmitting device. Alternatively, the status reports 30a and 30b may be sent to the transmitting device 10 using the same network over which the data bursts are conveyed to the receiving device 12, shown as the network 14 in FIG. 1.

When the status reports 32a and 32b are received by the transmitting device 10, they are passed to the status report processing component 34. The status report processing component 34 examines the received status reports 32a and 32b to determine which previously transmitted DTUs need to be retransmitted to the receiving device 12. As only those previously transmitted DTUs that are still stored in memory within the transmitting device 10 can be part of any retransmission, the set of outstanding bursts that is stored in memory in the transmitting device must include all those DTUs for which retransmission may be needed. Accordingly, until the correct receipt of every DTU in a given burst is confirmed from each receiving device to which the burst was transmitted, that burst is considered an outstanding burst.

The status processing component 34 may further operate to pass on any information regarding receive window sizes received in the status reports to the flow control component 19. For example, the status report messages 32a and/or 32b may include information describing the amount of available buffer space in respective receiving devices, that can be used to store transmitted bursts from the transmitting device 10. The flow control component may use such information to adjust the size of the burst sliding window, so that the number of outstanding bursts does not cause an overflow of receive buffers in any of the receiving devices.

Multiple status reports may be processed simultaneously by the status processing component 34. Those previously transmitted DTUs which need to be retransmitted are shown as retransmitted data 36, and are sent, for example over the network 14, to the receiving device 12. Upon the correct receipt of the retransmitted data 36 by the receiving device 12, previously sent DTUs that were damaged or lost are replaced and delivered to relevant application programs as necessary. Subsequent status reports from the receiving device 12 may accordingly reflect the receipt and processing status of such retransmitted data. The receive burst processing component 24, status report generating component, and status report processing component 34 may each be embodied using any appropriate combination of software code and/or programmable or custom hardware based technology.

While for purposes of concise illustration a single receiving device 12 is shown in FIG. 1, the disclosed system is advantageously applicable where a single transmitting device 10 operates to transmit individual bursts that are each received by multiple receiving devices. For example, such may be the case where multicast destination addresses are employed by the transmitting device. In the case where multiple receiving devices receive the bursts transmitted by the transmitting device, the structure and operation described herein with reference to receiving device 12 may be applicable to any or all such multiple receiving devices.

Figure 2:
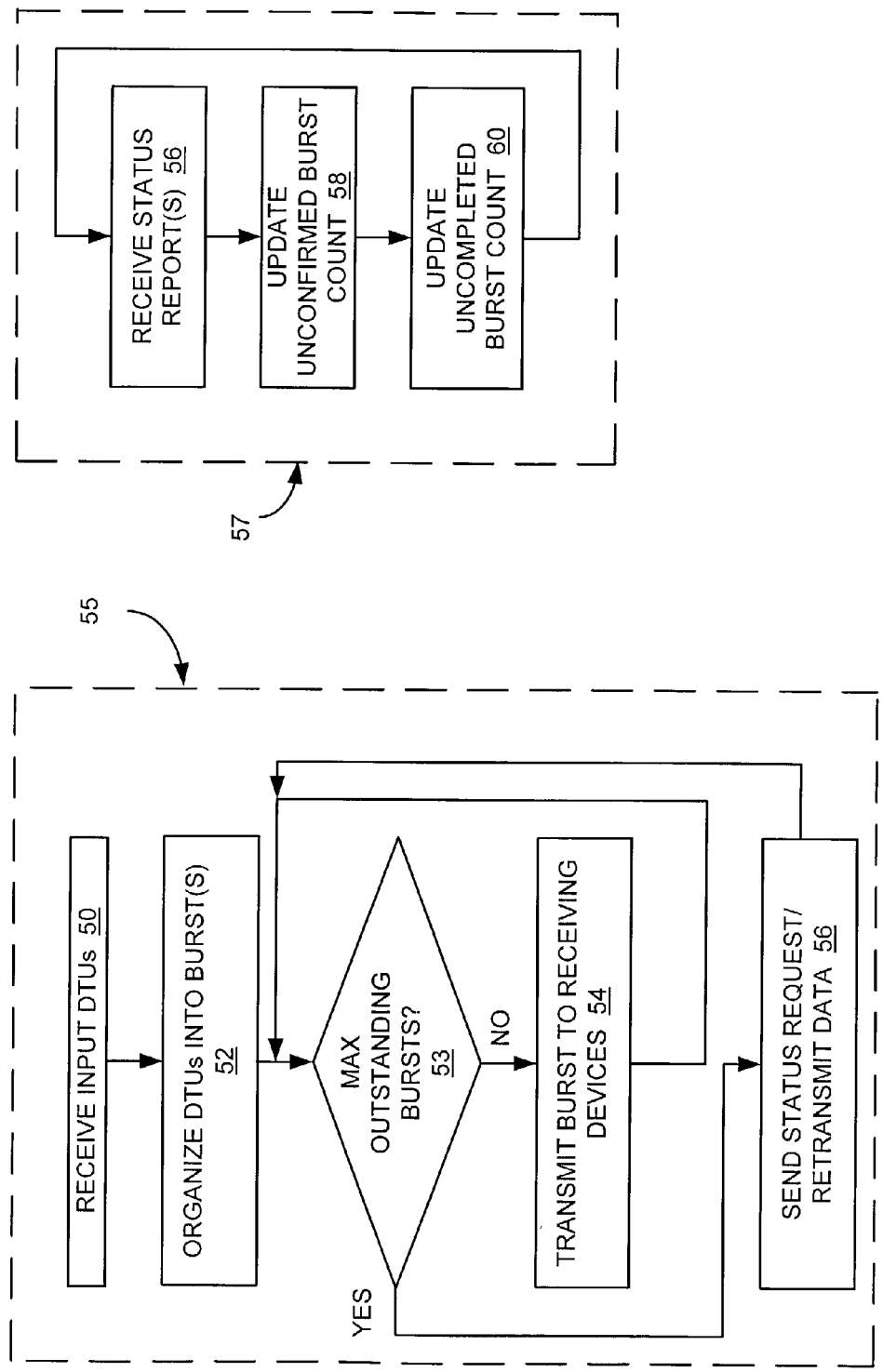
FIG. 2 is a flow chart showing steps performed by an illustrative embodiment of a transmitting device.

Now with reference to FIG. 2, steps performed by an illustrative embodiment of a transmitting device, such as the transmitting device 10 of FIG. 1, are described. In FIG. 2, two independent processes, 55 and 57 are shown, which may be performed simultaneously. For example, the processes 55 and 57 may be implemented as concurrently executing software processes, or in hardware logic, or in any appropriate combination of hardware and/or software, as needed by a particular embodiment or application of the disclosed system. The process 55 will be referred to herein as the burst generation and transmission process 55, and the process 57 will be referred to herein as the status report receipt and processing process 57.

At step 50 in the process 55, the transmitting device receives a number of DTUs for transmission to one or more receiving devices, such as the receiving device 12 of FIG. 1. At step 52, the transmitting device organizes at least one set of the DTUs received at step 50 into at least one burst for transmission. In the illustrative embodiment, each DTU within a burst contains information that enables a receiving device to determine the end of the burst, such as a position of that DTU within the burst.

The size of a burst, in terms of the number of DTUs within the burst, is referred to herein for purposes of explanation as the "burst size." The burst size for a given communication session may be a configurable parameter, determined and distributed among the transmitting device and receiving devices using a predetermined management protocol. Burst size is predetermined for purposes of explanation in the illustrative embodiment. A suitable burst size value for a given implementation may be determined in a variety of different ways. For example, an embodiment of the disclosed system has been shown to operate well where the burst size is set to a value on the order of 100 or 1000 DTUs.

At step 53, the flow control component 19 shown in FIG. 1 determines whether the current number of outstanding bursts has reached the maximum permitted number of outstanding bursts, also referred to as the burst sliding window size. If yes, then step 53 is followed by step 56, in which the transmitting device 10 may operate to either send a number of status request messages to one or more of the receiving devices from which status reports are needed, and/or retransmit data that has been indicated as either lost or damaged by the contents of one or more status report messages, or by the failure to receive one or more status report messages for over a predetermined time interval. When the number of outstanding bursts is determined to be less than the maximum number of outstanding bursts at step 53, then the transmitting device transmits a burst to the receiving device or devices at step 54.

As described above, steps 50, 52, 53, 54 and 56 represent a burst generation and transmission process 55. The burst generation and transmission process 55 continues while status reports are concurrently received and processed in the status report receipt and processing process 57. In one embodiment, the burst generation and transmission process 55 continues independently until a stop transmit condition is detected, at which point burst generation and transmission is paused or halted until a predetermined burst generation and transmission continuation condition is met.

In the status report receive process 57, at step 56 the transmitting device continuously receives status report messages. The received status report messages each include information describing the status of DTUs in one or more previously transmitted bursts, with regard to one of potentially many receiving devices.

In an illustrative embodiment, as part of the support for the determination made at step 53 of FIG. 2, the transmitting device 10 of FIG. 1 maintains state with regard to previously transmitted bursts as follows:

1) A "confirmed burst" is a previously transmitted burst for which the transmitting device has received status reports from all receiving devices to which the burst was addressed. The DTUs within a confirmed burst may or may not have been successfully received by all receiving devices for that burst.

2) An "unconfirmed burst" is a previously transmitted burst for which the transmitting device has not received a status report from at least one of the receiving devices to which the burst was addressed.

3) A "completed burst" is a confirmed burst for which all receiving devices have confirmed that they have successfully received and processed all DTUs within the burst.

4) An "uncompleted burst" is a confirmed or unconfirmed burst that requires some amount of retransmission, since at least one of the receiving devices to which the burst was addressed has indicated that at least one DTU within the burst was lost or damaged.

During processing of the status reports received at step 56, the transmitting device updates counters or other data structures that are used to maintain the numbers of bursts that fall within each of the above categories. In particular, at step 58, the transmitting system may update an unconfirmed burst counter, or the equivalent, to reflect the number of unconfirmed bursts (or DTUs) in view of the information contained in the status report. For example, in the event that status reports have been received from every receiving device for a given burst or DTU, then the number of unconfirmed bursts may be decremented at step 58. Similarly, if all the receiving devices for a given burst have provided status reports indicating that all DTUs within that burst have been successfully received and processed, then a counter representing the number of uncompleted bursts can be decremented at step 60. Those skilled in the art will recognize that a variety of specific mechanisms can be used for maintaining counts with regard to the above listed categories of bursts. The disclosed system is not limited to decrementing individual counters for unconfirmed bursts and uncompleted bursts at steps 58 and 60, and other specific data structures and/or steps may be used to maintain counts for some or all of the above burst categories. Moreover, those skilled in the art will further appreciate that while the above categories are described for purposes of explanation as numbers of bursts, they may be maintained as numbers of DTUs, or bytes, or some other appropriate metric in a given implementation.

In one embodiment, the flow control component 19 (FIG. 1) may operate to determine that the maximum number of outstanding bursts has been reached, and accordingly halt or suspend transmission of bursts, in the event that either:

a) a total number of unconfirmed bursts exceeds a predetermined maximum number of unconfirmed bursts, or b) a total number of uncompleted bursts exceeds a predetermined maximum number of uncompleted bursts.

In such an embodiment, in the event that either of the above conditions are met, the flow control component 19 operates to temporarily stop generating and transmitting bursts. For example, the maximum number of unconfirmed bursts may represent a limit on the amount of receive buffers for receiving bursts in any of the receiving devices in a group of receiving devices to which bursts are transmitted by the transmitting device. Specifically, in one embodiment, the maximum number of unconfirmed bursts may be represented in terms of the number of DTUs in the smallest receiver window. In such an embodiment, the number of unconfirmed bursts in the transmitter would also be maintained in terms of DTUs, where the size of a DTU is a predetermined value.

The maximum number of uncompleted bursts may represent a limit on the amount of buffers available for storing previously transmitted bursts in the transmitting device, also referred to as the sender window. Further in response to a determination that one of the above conditions is true, the disclosed system may operate to send one or more status request messages, and/or retransmit any lost or damaged DTUs to one or more receiving devices. For example, in the case where the number of unconfirmed bursts exceeds the predetermined limit, then the transmitting device may operate to send status request messages to one or more of the receiving devices, requesting status reports be returned. For example, in one embodiment, the status request message is multicast addressed and includes a list of device identifiers corresponding to those receiving devices in the receiver group for which status reports are requested.

In the event that the number of uncompleted bursts exceeds a predetermined limit, the transmitting system may retransmit DTUs previously reported to be lost or damaged to one or more receiving devices. Alternatively, or in addition, other conditions may trigger transmitting devices in the disclosed system to retransmit data and/or send status request messages. For example, a transmitting device may initiate a process in which lost data is retransmitted in response to a determination that the total number of lost DTUs is equal to the size of a burst, and/or when the data for a next burst is not yet available for transmission. A transmitting device may further be designed or configured to initiate retransmission of lost data as soon as a given burst has been confirmed, in that status reports have been received from all receiving devices. Alternatively, a transmitting device may operate such that it does not wait until a burst has been fully confirmed to start transmitting DTUs that have been reported as lost, acting to retransmit DTUs to those receiving devices that have provided status reports indicating that the DTUs have been lost.

After a predetermined number of requested status reports have been received, or after a predetermined number of DTUs reported as lost have been retransmitted and successfully received and processed, the transmitting device resumes the burst generation and transmission process 55. For example, when the number of unconfirmed bursts has gone below the predetermined limit on unconfirmed bursts, or when some threshold lower than the predetermined limit on unconfirmed bursts has been reached, the transmitting device may resume or restart the burst generation and transmitting process 55. Similarly, when the number of uncompleted bursts has gone below the predetermined limit on uncompleted bursts, or when some threshold lower than the predetermined limit on uncompleted bursts has been reached, the burst generation and transmission process 55 may be resumed.

Further in response to a determination that one of the above conditions is true, at step 56 the disclosed system may operate to send one or more status request messages to a number of receiving devices. For example, in the case where the number of unconfirmed bursts exceeds the predetermined limit, then at step 56 the transmitting device may operate to send status request messages to one or more of the receiving devices, requesting status reports be returned. For example, in one embodiment, the status request message includes a list of device identifiers corresponding to those receiving devices for which status reports are requested.

Figure 3:
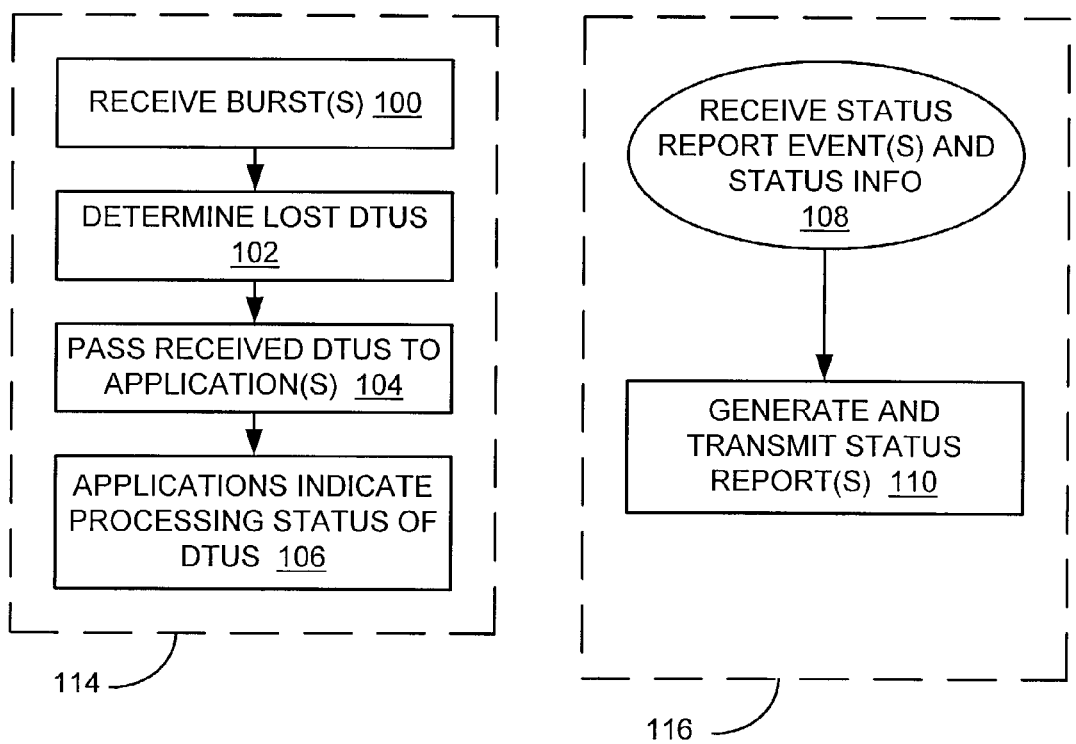
FIG. 3 is a flow chart showing steps performed by an illustrative embodiment in a receiving device.

FIG. 3 is a flow chart illustrating steps performed in a receiving device of an illustrative embodiment of the disclosed system. As shown in FIG. 3, a burst receiving and processing process 114 operates simultaneously with a status report generating and transmitting process 116. The processes 114 and 116 may be implemented as concurrent software processes, or as hardware logic, or any combination of software and/or hardware as appropriate for a specific application or embodiment.

At step 100 of the burst receiving and processing process 114, the receiving device receives a burst, and then determines at step 102 which, if any, DTUs in the burst were lost or damaged. Determination of lost or damaged DTUs may, for example, be performed using information within the burst, such as burst numbers, and/or conventional data integrity checks on each DTU, such as cyclic redundancy code (CRC) checks. The receiving device maintains the location of each lost or damaged DTU in the burst for subsequent transmission in a status report. At step 104, the receiving device passes successfully received DTUs from the received burst to one or more associated application programs. At step 106, the application programs in turn record or provide an indication of the processing status of each DTU for use when forming status reports.

Further as shown in FIG. 3, at step 108, the receiving device determines whether an event has occurred indicating that a status report should be transmitted to the transmitting device. In one embodiment, for example, a status report is generated and transmitted to the transmitting device in the event the end of a received burst is detected by the receiving device. Alternatively, or in addition, status reports may be generated and/or transmitted in the event that a status request message is received from the transmitting device. Further input at step 108 are data regarding the correct or failed receipt of DTUs in previously received bursts, as detected and recorded by the process 114.

In the event a status report is triggered by an event detected at step 108, at step 110 at least one status report is generated and transmitted to the transmitting device. The status report includes information indicating both the DTUs that require transmission within all previously received bursts, as well as the processing status of all DTUs in previously received bursts. The format of the status report generated at step 110 may, for example, consist of a packet or cell including implicitly or explicitly information, such as a bit mask, describing the receipt status of all bursts that have previously been received by that receiving device, for example over the course of a communications session between the receiving device and a transmitting device. In such an embodiment, the receipt status for all DTUs in every previously received burst is therefore transmitted multiple times from the receiving device to the transmitting device. For example, a status report message may include a series of bit masks, each of which corresponds to a previously received burst. Each bit in each bit mask corresponds to a DTU, with a first bit value indicating that the DTU was correctly received, and a second bit value indicating that the DTU was lost or damaged, and therefore must be retransmitted. Moreover, the bit values in the bit masks, or some additional information in the status reports, may indicate the processing status of the DTUs in the application programs of the receiving device.

In response to indication of lost DTUs in the status report generated and transmitted at step 110, the receiving device will receive retransmitted data from the transmitting device, which can then be used to substitute for the previously lost or damaged DTUs. Moreover, the receiving device may be embodied to perform error correction with regard to received bursts in which one or more DTUs were either lost or damaged. Various approaches to error correction may be employed in this regard, including Forward Error Correction (FEC), in which error correction information is included within the transmitted bursts to enable lost or damaged DTUs to be restored through an exclusive OR operation across a predetermined subset of the correctly received DTUs in the burst, as well as a corresponding portion of the error correction information included in the burst.

As described above, both the transmitting device and the receiving device process multiple bursts simultaneously. Accordingly, even before receipt of a status report from each receiving device regarding a first burst, or before receipt of a status report indicating correct receipt of all data within the first burst, the transmitting device may begin transmission of DTUs from a second burst. Moreover, while the receiving device is awaiting retransmission of a DTU that was not correctly received from the first burst, it can simultaneously begin processing other bursts in order to determine what kind of status report should be generated.

The independent processing of a burst within the transmitting device starts with transmission of all DTUs constituting that burst to the receivers. In the preferred embodiment, every DTU contains information that helps receivers define the end of a burst. The transmitting device obtains status reports regarding each simultaneously processed burst from all the receiving devices to which the bursts were addressed. For example, a communication session between a transmitting device and multiple receiving devices may be provided through the use of multicast destination addresses associated with the transmitted bursts. In such an environment, the transmitting device may request burst status information from each one of multiple receiving devices separately. The transmitting device may subsequently retransmit lost DTUs and collect status information again to determine if the retransmissions were received correctly. Retransmissions may be made at various times, for example, between burst transmissions. The disclosed system continues operation until all receiving devices in the session correctly receive all the DTUs within each burst. Thus, the transmitting device and the receiving device may each have several bursts in processing at the same time. In this way, the disclosed system increases the likelihood that a transmitting device can continue transmitting data without waiting, and accordingly also decreases the likelihood of a receiving device waiting for such data.

Figure 4:
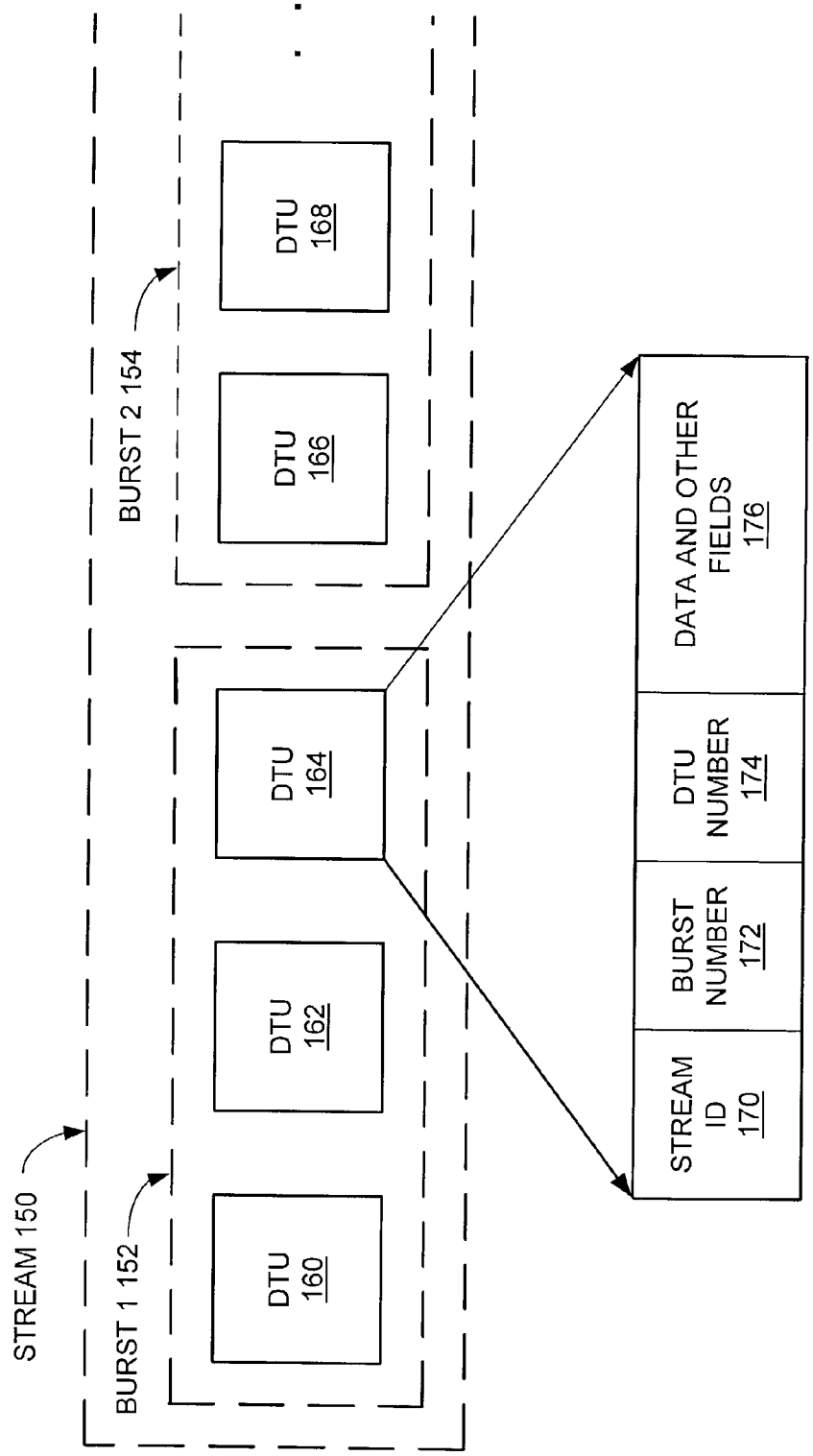
FIG. 4 is a block diagram showing an example of bursts of DTUs in a communication stream.

FIG. 4 shows an example of a data stream 150 including a series of bursts, shown as burst 1 152 and burst 2 154. The stream 150 represents the communication of a contiguous stream of data from a transmitting device to multiple receiving devices, for example using multicast addressing, as in the case of a streaming media server application. A data stream such as the data stream 150 may include any number of bursts. Each of the bursts within the data stream 150 includes a series of multiple DTUs, shown as DTU 160, DTU 162 and DTU 164 in burst 1 152, and as DTU 166 and DTU 168 in burst 2 154. An example of fields for a DTU is shown with regard to DTU 164. The illustrative DTU fields are shown as including a stream ID 170, which identifies the data stream that includes the DTU, a burst number 172 that identifies the position of the burst containing the DTU within the stream, and a DTU number 174 that identifies the position of the DTU within the burst that contains it. The DTU 164 is further shown to include data and other fields 176.

As shown in FIG. 4, a burst may not include header information other than that associated with each DTU. Specifically, the association of DTUs into a burst is accomplished through the information contained in the burst number field 172 of each DTU contained in the burst. Further, the structure of each burst, in terms of the positions of the DTUs it contains, is described in the DTU number field 174. Accordingly, the burst "header" may be thought of as being distributed across the DTUs included within the burst.

Figure 5:
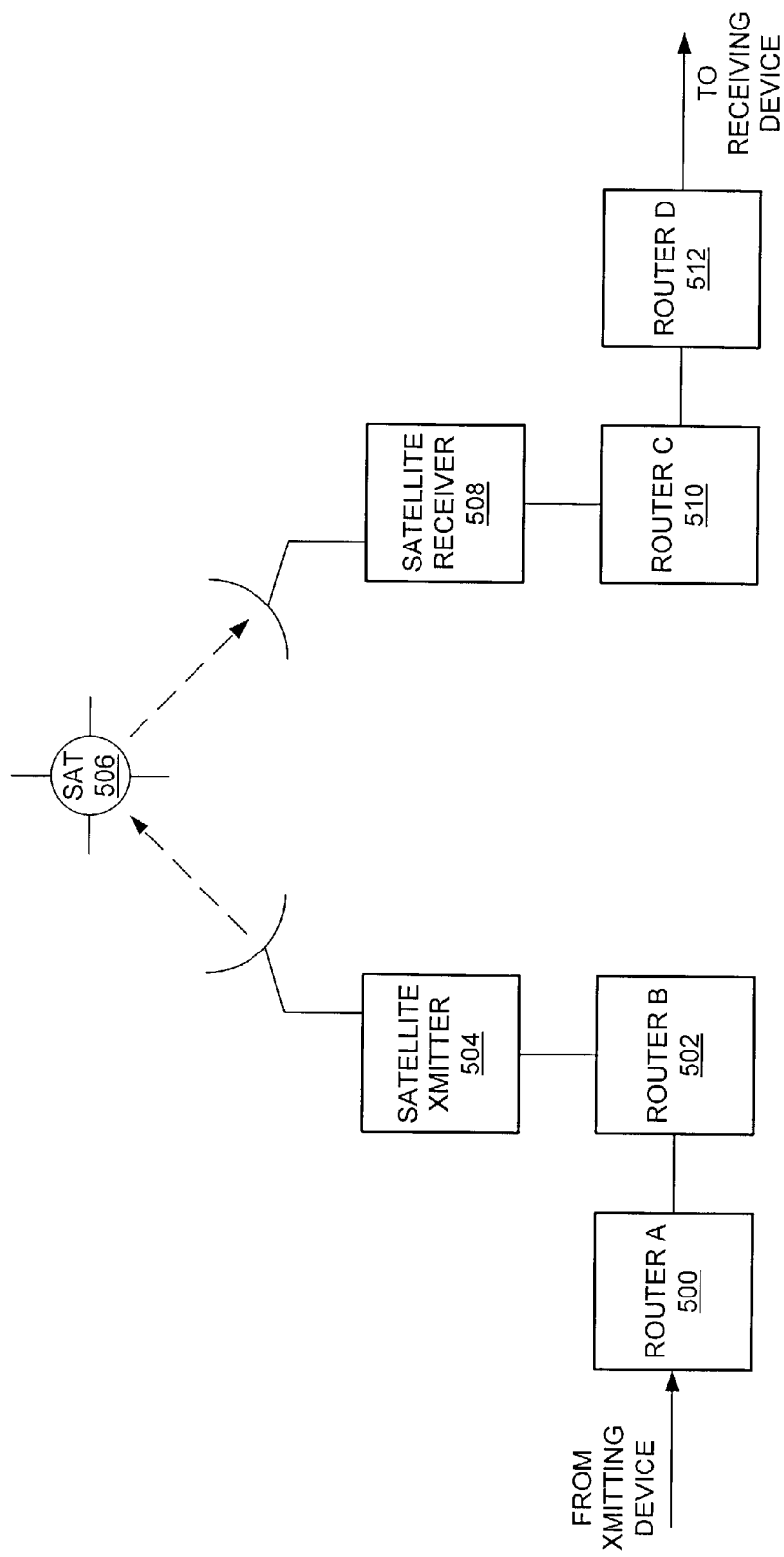
FIG. 5 shows an example configuration of the network 14 in FIG. 1.

FIG. 5 is a block diagram showing an example of a network over which data may be communicated using an embodiment of the disclosed system. The network illustrated in FIG. 5 is an example of the network 14 shown in FIG. 1. As shown in FIG. 5, data from a transmitting device passes through a Router A 500, to a Router B 502, and then to a Satellite Transmitter 504, which forwards the data to a Communications Satellite 506. The data is then passed by the Communications Satellite 506 to a Satellite Receiver 508, from which the data is passed through Router C 510 and Router D 512 to one or more receiving devices. The routers shown in FIG. 5 operate over an underlying communications network for which an MTU (Maximum Transmission Unit, Maximum Transfer Unit) may be predefined. The MTU for such a communications network is the largest frame size that can be transmitted over the network. Messages longer than the MTU must be divided into smaller frames. Typically, the layer 3 protocol (IP, IPX, etc.) extracts the MTU from the layer 2 protocol (Ethernet, FDDI, etc.), fragments the messages into that frame size and makes them available to the lower layer for transmission.

Figure 6:
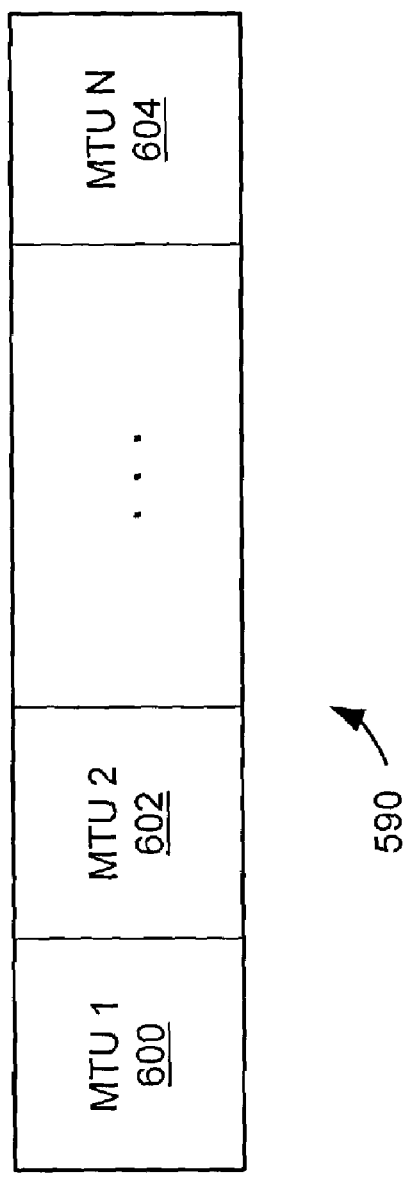
FIG. 6 shows an example of the data and other fields portion 176 of a DTU as shown in FIG. 4.

FIG. 6 shows how the contents of an individual DTU may be configured to reflect the MTUs used in an underlying network such as the communications network shown in FIG. 5. As shown in FIG. 4, the format of a DTU may include a data and other fields portion 176. FIG. 6 shows an example of the format 590 of the data and other fields portion of the DTU. The format 590 shown in FIG. 6 includes one or more MTUs, including an MTU 1 600, MTU 2, 602, through MTU N 604. In this way, the size of the DTU may be advantageously determined to reflect the size of MTU within the underlying network. As a result, bandwidth utilization is improved. In specific embodiments or operational environments, the contents of each DTU may therefore consist of one or more Ethernet packets, or one or more IP packets.

The DTU size for a given embodiment may further be configured as a function of the loss rate of the underlying network. In this approach, smaller DTU sizes would be used when the underlying network provides more unreliable performance. Accordingly, for higher loss rates, smaller DTUs would be used, thus making relatively frequent retransmission of data more efficient, since less successfully received data would necessarily be included in each retransmission.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

We claim:

1. A method of transmitting data to multiple receiving devices over a network, comprising the steps of:
   organizing a set of data transfer units into a plurality of subsets of said set of data transfer units, each subset including two or more data transfer units, each subset of said set of data transfer units for transmission by a transmitting device to multiple receiving devices, each subset being referred to as a burst,
   wherein each of said two or more data transfer units within a respective burst contains information to enable a receiving device to detect an end of the respective burst;
   in a first transmitting step, transmitting, by said transmitting device, a plurality of bursts to said multiple receiving devices;
   in the event at least one of said multiple receiving devices detects the end of a transmitted burst, generating at least one status report message and transmitting said at least one status report message to said transmitting device,
   wherein said at least one status report message includes at least one acknowledgement that at least one of the bursts transmitted in said first transmitting step has been received by said at least one of said multiple receiving devices;
   monitoring, at said transmitting device, for receipt of at least one status report message from at least one of said multiple receiving devices, wherein each burst transmitted in said first transmitting step that has not been acknowledged as being received by said at least one of said multiple receiving devices is referred to as an outstanding burst;
   determining a current number of outstanding bursts;
   comparing said current number of outstanding bursts with a predetermined maximum number of outstanding bursts; and
   in a second transmitting step, in the event said current number of outstanding bursts is less than said predetermined maximum number of outstanding bursts, transmitting, by said transmitting device, at least one additional burst to said multiple receiving devices.

2. The method of claim 1, further comprising suspending transmission of the bursts in the event that said current number of outstanding bursts is not less than said predetermined maximum number of outstanding bursts.

3. The method of claim 1, further comprising:
   maintaining a current number of unconfirmed bursts, wherein said current number of unconfirmed bursts comprises the number of previously transmitted bursts for which status information has not been received from at least one receiving device;
   comparing said current number of unconfirmed bursts with a predetermined maximum number of unconfirmed bursts; and
   suspending transmission of the bursts in the event that said current number of unconfirmed bursts is not less than said predetermined maximum number of outstanding bursts.

4. The method of claim 1, further comprising:
   maintaining a current number of unconfirmed bursts, wherein said current number of unconfirmed bursts comprises the number of previously transmitted bursts for which status information has not been received from at least one receiving device;
   comparing said current number of unconfirmed bursts with a predetermined maximum number of unconfirmed bursts; and
   suspending transmission of the bursts in the event that said current number of unconfirmed bursts is not less than said predetermined maximum number of unconfirmed bursts.

5. The method of claim 1, further comprising:
   maintaining a current number of uncompleted bursts, wherein said current number of uncompleted bursts comprises the number of previously transmitted bursts for which at least one receiving device has provided status information indicating that at least one data transfer unit in the respective burst was not successfully received;
   comparing said current number of uncompleted bursts with a predetermined maximum number of uncompleted bursts; and
   suspending transmission of the bursts in the event that said current number of uncompleted bursts is not less than said predetermined maximum number of uncompleted bursts.

6. The method of claim 1, further comprising:
   incrementing said current number of outstanding bursts in response to said transmitting of each burst; and
   decrementing said current number of outstanding bursts in response to a determination that status information has been received from each receiving device indicating that all data transfer units within a previously transmitted burst were successfully received.

7. The method of claim 6, further comprising:
   suspending transmission of the bursts in the event that said current number of outstanding bursts is not less than said predetermined maximum number of outstanding bursts; and
   restarting transmission of the bursts in the event that said current number of outstanding bursts is decremented to a value less than said predetermined maximum number of outstanding bursts.

8. The method of claim 1, further comprising:
   determining said predetermined maximum number of outstanding bursts in response to an amount of buffer resources available in said transmitting device for storing previously transmitted bursts.

9. The method of claim 1, further comprising:
   determining said predetermined maximum number of outstanding bursts in response to an amount of buffer resources available in each of said multiple receiving devices for storing received bursts.

10. The method of claim 9, wherein said determining said predetermined maximum number of outstanding bursts is performed responsive to receiving said at least one status report message from at least one receiving device, wherein said status report message indicates a current amount of buffer resources available in said at least one receiving device.

11. The method of claim 1, further comprising:
    incrementing said current number of outstanding bursts in response to said transmitting of each burst; and
    decrementing said current number of outstanding bursts in response to a determination that status information has been received from each receiving device indicating that all data transfer units within a previously transmitted burst were successfully received and processed by at least one application program.

12. The method of claim 1 wherein the information contained in each of said two or more data transfer units to enable a receiving device to detect an end of a respective burst comprises a position of the data transfer unit within the respective burst.

13. A device for transmitting data to multiple receiving devices over a network, said device comprising:
- at least one processor;
- at least one computer program; and
- at least one memory operative to store the computer program, said at least one memory being communicably coupled to said at least one processor;
- wherein the processor executes the computer program out of the memory:
  - to organize a set of data transfer units into a plurality of subsets of said set of data transfer units, each subset including two or more data transfer units, each subset of said set of data transfer units for transmission to multiple receiving devices, each subset being referred to as a burst,
  - wherein each of said two or more data transfer units within a respective burst contains information to enable a receiving device to detect an end of the respective burst;
  - to transmit a plurality of bursts to said multiple receiving devices;
  - to monitor for receipt of at least one status report message from at least one of said multiple receiving devices, said at least one status report message being generated and transmitted by said at least one of said multiple receiving devices in response to detection of the end of at least one transmitted burst, said at least one status report message including at least one acknowledgement that at least one of the transmitted bursts has been received by said at least one of said multiple receiving devices,
  - wherein each transmitted burst that has not been acknowledged as being received by said at least one of said multiple receiving devices is referred to as an outstanding burst;
  - to determine a current number of outstanding bursts;
  - to compare said current number of outstanding bursts with a predetermined maximum number of outstanding bursts; and
  - in the event that said current number of outstanding bursts is less than said predetermined maximum number of outstanding bursts, to transmit at least one additional burst to said multiple receiving devices.

14. The device of claim 13, wherein said device further comprises at least one processor coupled to a program memory.

15. The device of claim 13, further operable to suspend transmission of the bursts in the event that said current number of outstanding bursts is not less than said predetermined maximum number of outstanding bursts.

16. The device of claim 13 wherein the information contained in each of said two or more data transfer units to enable a receiving device to detect an end of a respective burst comprises a position of the data transfer unit within the respective burst.

17. A device for transmitting data to multiple receiving devices over a network, comprising:
- means for organizing a set of data transfer units into a plurality of subsets of said set of data transfer units, each subset including two or more data transfer units, each subset of said set of data transfer units for transmission to multiple receiving devices, each subset being referred to as a burst,
- wherein each of said two or more data transfer units within a respective burst contains information to enable a receiving device to detect an end of the respective burst;
- means for transmitting a plurality of bursts to said multiple receiving devices;
- means for monitoring for receipt of at least one status report message from at least one of said multiple receiving devices, said at least one status report message being generated and transmitted by said at least one of said multiple receiving devices in response to detection of the end of at least one transmitted burst, said at least one status report message including at least one acknowledgement that at least one of the transmitted bursts has been received by said at least one of said multiple receiving devices,
- wherein each transmitted burst that has not been acknowledged as being received by said at least one of said multiple receiving devices is referred to as an outstanding burst;
- means for determining a current number of outstanding bursts;
- means for comparing said current number of outstanding bursts with a predetermined maximum number of outstanding bursts; and
- means for transmitting, in the event that said current number of outstanding bursts is less than said predetermined maximum number of outstanding bursts, at least one additional burst to said multiple receiving devices.

18. The device of claim 17, further comprising means for suspending transmission of the bursts in the event that said current number of outstanding bursts is not less than said predetermined maximum number of outstanding bursts.

19. The device of claim 17 wherein the information contained in each of said two or more data transfer units to enable a receiving device to detect an end of a respective burst comprises a position of the data transfer unit within the respective burst.

20. A method of providing status with regard to data received over a network, comprising the steps of:
- providing an amount of receive buffer resources to a transmitting device, said receive buffer resources for storing at least a portion of a set of data transfer units, said set of data transfer units being organized into a plurality of subsets of said set of data transfer units, each subset being referred to as a burst,
- wherein said amount of receive buffer resources represents a predetermined number of the bursts received from a transmitting device that can be stored prior to being processed by at least one application program,
- wherein each of the received bursts includes two or more data transfer units, and
- wherein each of said two or more data transfer units within a respective burst contains information to enable detection of an end of the respective burst;
- receiving a plurality of bursts from said transmitting device; and
- in response to detection of the end of at least one received burst, generating at least one status report message and transmitting said at least one status report message to said transmitting device,
- wherein each of said status report messages indicates a receipt status of each data transfer unit within each previously received burst.

21. The method of claim 20, wherein each of said status report messages indicates said amount of receive buffer resources.

22. The method of claim 20, wherein each of said status report messages further indicates a processing status with regard to each of the received bursts, wherein said processing status indicates whether at least one application program has processed each of the received bursts.

23. The method of claim 20 wherein the information contained in each of said two or more data transfer units to enable detection of an end of a respective burst comprises a position of the data transfer unit within the respective burst.

24. A device for providing status with regard to data received over a network, said device comprising:
   at least one processor;
   at least one computer program; and
   at least one memory operative to store the computer program, said at least one memory being communicably coupled to said at least one processor;
   wherein the processor executes the computer program out of the memory:
   to provide an amount of receive buffer resources to a transmitting device, said receive buffer resources for storing at least a portion of a set of data transfer units, said set of data transfer units being organized into a plurality of subsets of said set of data transfer units, each subset being referred to as a burst,
   wherein said amount of receive buffer resources represents a predetermined number of bursts received from a transmitting device that can be stored prior to being processed by at least one application program,
   wherein each of the received bursts includes two or more data transfer units, and
   wherein each of said two or more data transfer units within a respective burst contains information to enable detection of an end of the respective burst;
   to receive a plurality of bursts from said transmitting device; and
   in response to detection of the end of at least one received burst, to generate at least one status report message, and to transmit said at least one status report message to said transmitting device,
   wherein each of said status report messages indicates a receipt status of each data transfer unit within each previously received burst.

25. The device of claim 24, wherein each said status report message further indicates a processing status with regard to each of the received bursts, wherein said processing status indicates whether at least one application program has processed each of the received bursts.

26. The device of claim 24, further comprising at least one processor coupled to a program memory.

27. The device of claim 24 wherein the information contained in each of said two or more data transfer units to enable detection of an end of a respective burst comprises a position of the data transfer unit within the respective burst.

28. A device for providing status with regard to data received over a network, comprising:
   means for providing an amount of receive buffer resources to a transmitting device, said receive buffer resources for storing at least a portion of a set of data transfer units, said set of data transfer units being organized into a plurality of subsets of said set of data transfer units, each subset being referred to as a burst,
   wherein said amount of receive buffer resources represents a predetermined number of bursts received from a transmitting device that can be stored prior to being processed by at least one application program,
   wherein each of the received bursts includes two or more data transfer units, and
   wherein each of said two or more data transfer units within a respective burst contains information to enable detection of an end of the respective burst;
   means for receiving a plurality of bursts from said transmitting device; and
   means for generating at least one status report message and for transmitting said at least one status report message to said transmitting device in response to detection of the end of at least one received burst,
   wherein each of said status report messages indicates a receipt status of each data transfer unit within each previously received burst.

29. The device of claim 28, wherein said means for transmitting said at least one status report message further comprises means for providing each of said status report messages with an indication of a processing status with regard to each of the received bursts, wherein said processing status indicates whether at least one application program has processed each of the received bursts.

30. The device of claim 28 wherein the information contained in each of said two or more data transfer units to enable detection of an end of a respective burst comprises a position of the data transfer unit within the respective burst.

31. A method of transmitting data over a network, comprising the steps of:
   organizing a set of data transfer units into a plurality of subsets of said set of data transfer units, each subset of said set of data transfer units including two or more data transfer units, each subset of said set of data transfer units being referred to as a burst,
   wherein each of said two or more data transfer units within a respective burst contains information to enable a receiving device to detect an end of the respective burst;
   transmitting, by a transmitting device, a plurality of bursts over a network;
   in the event at least one receiving device detects the end of at least one transmitted burst, generating at least one acknowledgement that said at least one transmitted burst has been received by said at least one receiving device, and transmitting said at least one acknowledgement over said network to said transmitting device, said at least one receiving device being communicably coupled to said network;
   monitoring for receipt of at least one acknowledgement over said network,
   wherein each of said transmitted plurality of bursts that has not been acknowledged as being received is referred to as an outstanding burst;
   determining a current number of outstanding bursts;
   comparing said current number of outstanding bursts with a specified maximum number of outstanding bursts; and
   in the event said current number of outstanding bursts is less than said specified maximum number of outstanding bursts, transmitting at least one additional burst over said network.

32. The method of claim 31 wherein the information contained in each of said two or more data transfer units to enable a receiving device to detect an end of a respective burst comprises a position of the data transfer unit within the respective burst.

* * * * *